(12) United States Patent
Nakamura et al.

(10) Patent No.: US 8,792,177 B2
(45) Date of Patent: Jul. 29, 2014

(54) HEAD-UP DISPLAY

(71) Applicant: Yazaki Corporation, Tokyo (JP)

(72) Inventors: Go Nakamura, Shizuoka (JP); Kunimitsu Aoki, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 13/796,816

(22) Filed: Mar. 12, 2013

(65) Prior Publication Data
US 2013/0188259 A1 Jul. 25, 2013

Related U.S. Application Data

(63) Continuation of application No. PCT/JP2011/070646, filed on Sep. 9, 2011.

(30) Foreign Application Priority Data

Sep. 13, 2010 (JP) ................. 2010-204688

(51) Int. Cl.
*G02B 27/14* (2006.01)
*G02B 27/01* (2006.01)

(52) U.S. Cl.
CPC ........ *G02B 27/01* (2013.01); *G02B 2027/0185* (2013.01); *G02B 2027/0127* (2013.01); *G02B 27/0101* (2013.01)
USPC ...................................................... 359/630

(58) Field of Classification Search
USPC ................................................ 359/630, 640
See application file for complete search history.

(56) References Cited

U.S. PATENT DOCUMENTS

| | | | | |
|---|---|---|---|---|
| 4,925,272 A | * | 5/1990 | Ohshima et al. | 359/630 |
| 2009/0067057 A1 | * | 3/2009 | Sprague et al. | 359/630 |

FOREIGN PATENT DOCUMENTS

| | | |
|---|---|---|
| JP | 6-27411 A | 2/1994 |
| JP | 6-115381 A | 4/1994 |
| JP | 6-138409 A | 5/1994 |

OTHER PUBLICATIONS

International Search Report for PCT/JP2011/070646 dated Dec. 13, 2011.

* cited by examiner

*Primary Examiner* — Scott J Sugarman
*Assistant Examiner* — Mustak Choudhury
(74) *Attorney, Agent, or Firm* — Kenealy Vaidya LLP

(57) ABSTRACT

A head-up display includes a first display device, and a second display device which is provided at a position which is different from a position of the first display device. An optical axis identifying device outputs light beams, which are respectively input from the first display device and second display device, in the identical direction. An enlarged-image forming device enlarges respective images which are formed by the light beams which are output from the first display device and the second display device, based on the light beams which are input from the optical axis identifying device, and forms an image by overlapping the images which are enlarged. A moving device moves at least one of the first display device and the second display device along respective optical axis directions thereof.

3 Claims, 16 Drawing Sheets

HEAD-UP DISPLAY

BACKGROUND ART

The present invention is related to a head-up display, and in particular, is related to a head-up display in which a position to be displayed is changed according to a driving situation.

The head-up display (hereinafter, referred to as HUD) is a device which displays a display of a gauge board to be overlapped with a part of forward field of vision in order to prevent a pilot, or a vehicle driver from diverting his/her field of vision, that is, moving his/her gaze to view an instrument board.

Such an HUD is applied to a field of vision display device of various simulators such as a flight simulator, a space docking simulator, a ship handling simulator, a vehicle travel simulator, or a video display device such as a display of various game devices, or the like.

For example, in the above described various simulators, it is preferable that a displayed video be displayed so as to be infinite similarly to a case of a real aircraft, or the like. When a display surface of a CRT (cathode ray tube) is used as a video display surface, or when a video is displayed by being projected on a screen by a video projector, the video is merely displayed as a video which is present at a position of the display surface.

As means for solving this problem, a HUD which is an infinity display device in which a concave mirror is used has been known. FIG. 12 is a diagram which illustrates a principle of an infinity display using the concave mirror. A spherical center of the concave mirror M is set to O, and a focal position thereof is set to F. When an object PQ is on the concave mirror M side rather than the focal position F, an image which is formed by the concave mirror M becomes an erected virtual image as denoted by P'Q'.

A position and a size of the virtual image are changed by a position of the object PQ. When a position of the object PQ is in FA (A is intersection point of concave mirror M and optical axis), that is, when a<f in the figure, the position b of the virtual image becomes $$b=af/(a-f) \quad (1).$$

If a gets infinitely close to f, the b gets close to infinity.
On the other hand, a size of the image P'Q' becomes $$P'Q'=PQ\times|f|/|a-f| \quad (2).$$

Similarly, If a gets infinitely close to f, the size of the virtual image P'Q' becomes close to infinity.

However, as illustrated in the identical figure, when the object PQ is on the optical axis of the concave mirror M, the object PQ becomes an obstacle, and the virtual image P'Q' is not viewed by having the spherical center O as a viewpoint. Therefore, as illustrated in FIG. 13, a half mirror 101 is provided to cross the optical axis of the concave mirror M at an angle of 45° between the concave mirror M and a focal point which is located in the focal distance f thereof. A CRT 102 is arranged so that a video 104 on an image surface 103 of the CRT 102 is reflected on the half mirror 101 in the optical axis direction of the concave mirror M. The video 104 produces the virtual image using the concave mirror M. The virtual image transmits the half mirror 101, and is viewed by having the spherical center O as a viewpoint. It is possible to use a liquid crystal display, a projection screen, or the like, instead of the CRT 102. In addition, the half mirror 101 may not necessarily cross the optical axis of the concave mirror M at an angle of 45°.

However, in the related art, the video display surface of the HUD having the above described configuration, for example, the image surface 103 of the CRT 102 has been fixed to a main body of a simulator. For this reason, a distance of a virtual image 105 which is viewed from a viewpoint becomes infinite, or a constant distance which is close to infinite.

In general, when an user views an outside from a cockpit of an aircraft, a runway in the front of the cockpit, a mountain range, clouds, or the like is seen as a distant view. On the other hand, a runway which is in front of, and at the lower part of the cockpit, or a downward view in the vicinity of the ground which is seen downward from a helicopter is seen in the short distance. Further, in a space docking simulator, a simulator of a space manipulator system, or the like, a display of a field of vision in which a real distance of a target corresponds to a visual distance thereof is necessary, in particular.

Therefore, according to the above described request, an HUD which is able to change a visual distance of a field of vision from infinity to a short distance corresponding to a visual distance in a field of vision from a real machine, or to a real distance of a target has been proposed (for example, refer to Patent Document 1).

That is, in an HUD having a configuration which is exemplified in FIG. 14, video display means such as the CRT 102, or the like is configured such that an image surface 103 thereof can be displaced between a position corresponding to a focal point of a concave mirror M and a position which is closer to a half mirror 101 than the position corresponding to the focal point of the concave mirror, on an optical axis of a light beam which is to be reflected on the half mirror 101 in the optical axis direction of the concave mirror M.

In this manner, in the HUD having the above described configuration, since the video display means such as the CRT 102 is set to be displaced between the position at which the image surface 103 corresponds to the focal point of the concave mirror M and the position which is closer to the half mirror 101 than the position corresponding to the focal point of the concave mirror, it is possible to make an image forming position of the virtual image 105 variable between the infinite position and the position which is dose to the viewpoint to some extent. Accordingly, it is possible to align the virtual image position at a real distance of a target, or a visual distance of a field of vision, since the video display means is moved according to a real distance of a target, or a visual distance of the field of vision depending on contents of a displayed video.

Meanwhile, even in a field of an automobile, or the like, an HUD which includes a control unit which is able to change an image forming position of a virtual image in a head-up display in which a windshield is used as a combiner, and can easily perform a far and near viewpoint adjusting, and size adjusting of a virtual image using a relationship in a vehicle speed has been proposed (for example, refer to Patent Document 2).

That is, in the HUD, a concave mirror 201 is used as a turning mirror, and display moving device for moving a display as an object point manually, automatically, or a combination of these in a region in which a virtual image point of the concave mirror 201 is caused to appear is provided. According to such a virtual image control unit, it is possible to automatically control a distance to an image forming position which is displayed according to a vehicle speed, and to manually change an image forming distance according to the vehicle speed depending on individual differences.

Regarding this, detailed descriptions will be made below.
As is well known, an expression of image forming relating to a spherical mirror has been widely known. A principle of controlling a focal distance of an appearing virtual image, and a size thereof by moving a display as an object point in a range in which a virtual image point of a concave mirror is caused to appear, based on a relationship of the expression of image forming is illustrated in FIGS. 15 and 16.

That is, as illustrated in the figures, it is possible to control the focal distance and the size of the virtual image which is reflected by a combiner 204 by moving display content 203 of a display 202 in a range in which the virtual image point of the concave mirror 201 is caused to appear.

Here, a case in which the display content 203 is arranged at a position which is illustrated in FIG. 16 will be taken into consideration. A position of the display content 203 is assumed to the A point which is present in a range of a focal distance f of the concave mirror 201. When the display contents 203 is arranged at the A point, a virtual image of the display content 203 appears in a virtual image point C. In addition, the virtual image of the display content 203 is enlarged in the concave mirror 201, is reflected on the combiner 204, and is input to an eye point 205, however, a human eye visually percepts as if the display content 203 is present at the point C. Here, when the display content 203 is moved to the point B from the point A, as illustrated in FIG. 16, a virtual image point becomes the point D, and an image becomes far and large compared to the virtual image at the above described point C.

That is, this is because, the closer the display content 203 to the mirror surface, the smaller the virtual image which appears due to an operation of the concave mirror 201. Accordingly, a large virtual image is reflected on the combiner 204 in the point B compared to the point A. For a driver who views a virtual image through the combiner 204, a viewing point becomes also a far viewpoint when driving at high speed, therefore, it is preferable that the display content 203 be far. Alternatively, it is preferable that the display content 203 be close, since the viewing point becomes a close viewpoint when driving at low speed. As illustrated in FIG. 16, when the display 202 is present at the point A, the display content 203 are at a close viewpoint, and the display content 203 become small. In addition, when the display 202 is present at the point B, the display content 203 are at a far viewpoint, and the display content 203 become large.

In this manner, in the HUD having the above described configuration, a defect in the related art that a virtual image is merely present at a far place is eliminated by focusing on a role of a virtual image in far and near viewpoints.

[Patent Document 1] JP-A-6-27411
[Patent Document 2] JP-A-6-115381

SUMMARY

It is therefore one advantageous aspect of the present invention to provide a head-up display in which, when a display position is moved in the front-back direction of a vehicle, various effective functions are added in connection therewith, and which can make display information so as to be able to display display contents such as warning relating to driving sensuously, and easy to understand.

According to one advantage of the invention, there is provided a head-up display comprising:
a first display device;
a second display device, provided at a position which is different from a position of the first display device;
an optical axis identifying device that outputs light beams, which are respectively input from the first display device and second display device, in the identical direction;

an enlarged-image forming device that enlarges respective images which are formed by the light beams which are output from the first display device and the second display device, based on the light beams which are input from the optical axis identifying device, and forms an image by overlapping the images which are enlarged; and
a moving device that moves at least one of the first display device and the second display device along respective optical axis directions thereof.

The head-up display may be configured such that: the moving device includes first moving device that moves the first display device along the optical axis direction thereof, and second moving device that moves the second display device along the optical axis direction thereof.

DETAILED DESCRIPTION OF EXEMPLIFIED EMBODIMENTS

In the above described two types of HUDs of the related arts, both have a configuration in which video display means is moved according to a real distance of a target, or a visual distance of a field of vision. However, in a configuration in which merely the video display means is moved according to the real distance of the target, or the visual distance of the field of vision, there is a concern that reading of display information may become difficult, for example, it is difficult to read information such as characters, marks, or the like, which are displayed, because, when a viewpoint becomes dose, it merely makes a display image also small, for example.

It is therefore one advantageous aspect of the present invention to provide a head-up display in which, when a display position is moved in the front-back direction of a vehicle, various effective functions are added in connection therewith, and which can make display information so as to be able to display display contents such as warning relating to driving sensuously, and easy to understand.

Hereinafter, embodiments of the present invention will be described in detail while referring to accompanying drawings.

First Embodiment

Figure 1:
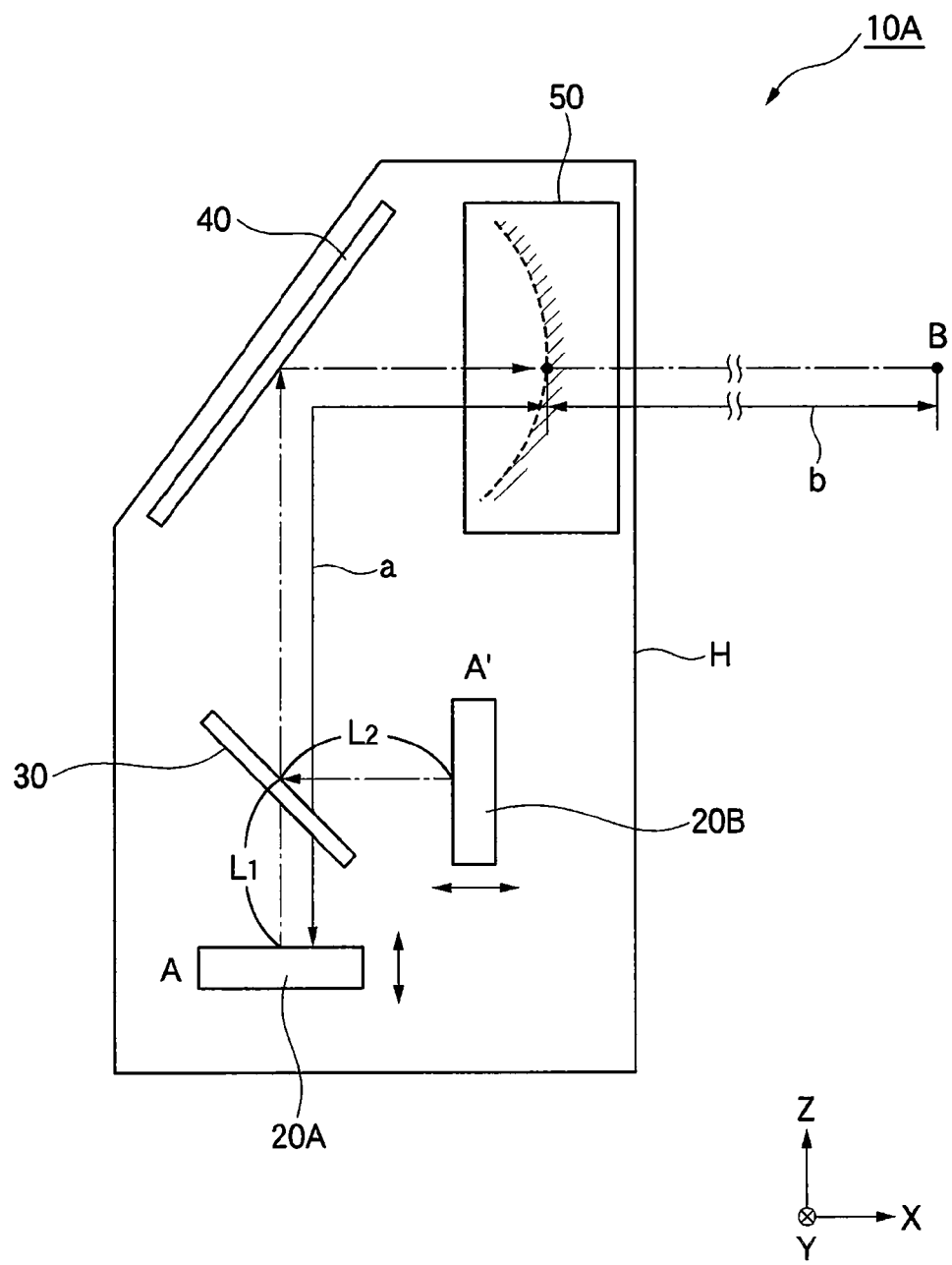
FIG. 1 is a schematic configuration diagram which illustrates a head-up display according to a first embodiment of the present invention.

FIG. 1 illustrates a head-up display 10A according to a first embodiment of the present invention. The head-up display 10A causes an enlarged virtual image which is formed in enlarged-image forming device 50 to be displayed in a field of vision of a driver in front of a windshield (not shown) which is the driving direction.

In the head-up display 10A, a housing H which includes a first display device 20A, a second display device 20B, optical axis identifying device 30, a deflecting mirror 40, enlarged-image forming device 50, first moving device 60A and second moving device 60B is built in a vehicle body which is not shown. In addition, in a case of the embodiment, a speedometer as a digital image (virtual image) is displayed in the field of vision in front of the windshield which is not shown.

According to the embodiment, the first display device 20A is configured by a liquid crystal display device (hereinafter, referred to as "first LCD") in which an LED (light emitting diode) light source or the like is used as a back light. The first display device 20A according to the embodiment performs a digital display of a current speed (α; refer to FIG. 2). When receiving an output signal from a speed sensor (not shown), the first display device 20A performs a digital display of a speed level corresponding to the signal. In addition, the first display device 20A is attached with the first moving device 60A which will be described later (refer to FIGS. 4A and 4B), and is able to change a size of numbers of the speed level which is digitally displayed by changing a distance (L1) between the first display device and the optical axis identifying device 30 according to a traveling speed.

The second display device 20B is configured by the same liquid crystal display device (hereinafter, referred to as "second LCD") as the first display device 20A. The second display device 20B according to the embodiment is set to display a frame (β; refer to FIG. 2) which surrounds the outside of the digital speed display (α). In addition, the second display device 20B is also attached with the second moving device 60B which will be described later, and is able to change a size of the frame corresponding to the traveling speed by changing a distance ($L_2$) between the second display device and the optical axis identifying device 30 according to the traveling speed. In addition, according to the embodiment, respective moving device are attached to each display device, however, it may be a configuration in which the moving device is attached to at least any one of the display devices.

Figure 2:
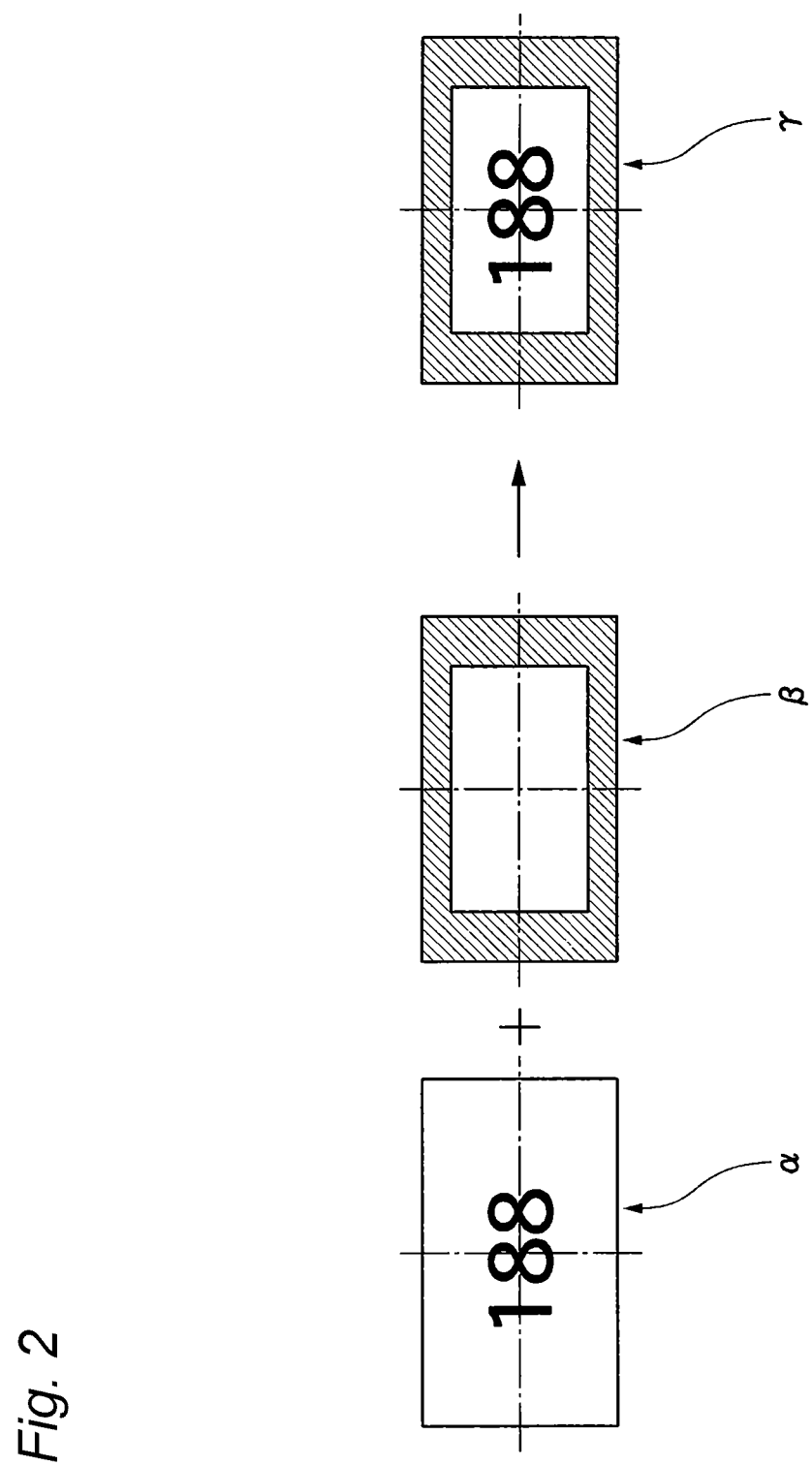
FIG. 2 is an explanatory diagram which illustrates a basic principle of the head-up display according to the present invention.

The optical axis identifying device 30 is means for outputting light which is input from the respective first and second display devices 20A and 20B in the identical direction. In this manner, a virtual image based on the light which is output from the optical axis identifying device 30 is formed as a display image (γ) in which the digital speed display (α) and the frame (β) are overlapped as illustrated in FIG. 2. The optical axis identifying device 30 according to the embodiment is configured by a half mirror, and causes light of first waveform which vertically inputs to the optical axis identifying device 30, and transmits thereof among light beams of waveform corresponding to display information which is formed in the first display device 20A, and is output, and light of second waveform which is input to the optical axis identifying device 30, and is reflected among light beams of waveform corresponding to display information which is formed in the second display device 20B, and is output to interfere with each other, and then to proceed toward the deflecting mirror 40.

In addition, according to the embodiment, the optical axis identifying device 30 is configured by the half mirror, however, it is not particularly limited to this. For example, the optical axis identifying device may be configured by a PBS (polarization beam splitter) or the like which causes the first waveform of a specific polarization plane (P polarization) which is output from the first display device 20A, for example, to be transmitted at a predetermined high ratio, and causes the second waveform of a specific polarization plane (S polarization) which is output from the second display device 20B, and of which the polarization plane is orthogonal to the polarization plane of the first waveform to be reflected at a predetermined high ratio. In addition, the optical axis identifying device may be configured by transmitted waveform selection means such as a multiple-layer filter or the like which selectively transmits light, for example, of a specific wavelength at extremely high ratio, and selectively reflects the light of specific wavelength at extremely high ratio, in addition to this.

The deflecting mirror 40 enables the optical path length to be obtained in a narrow space by deflecting the direction of an optical path which is output by the optical axis identifying device 30 by 90 degrees, and makes various optical elements be compactly accommodated in the inner space of the housing H. In this manner, the housing H is preferably provided in a vehicle with a narrow space by miniaturizing the housing. In addition, the deflecting mirror 40 is provided as needed according to the embodiment, however, as in a case of a second embodiment which will be described later, the deflecting mirror is not essential in the present invention.

Figure 3:
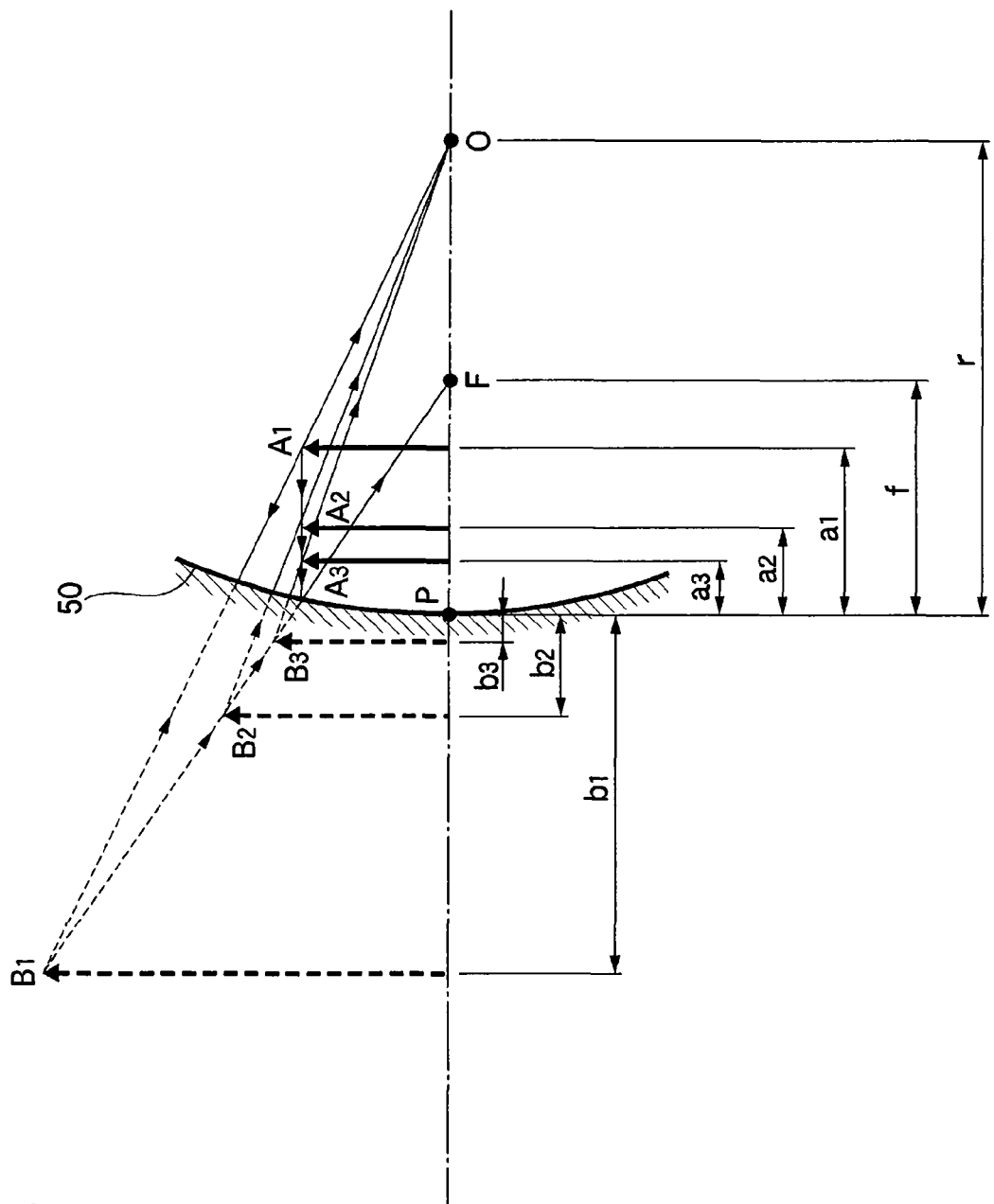
FIG. 3 is an optical schematic diagram which illustrates a positional relationship of a display device of the head-up display according to the present invention and an enlarged virtual image which is formed.

The enlarged-image forming device 50 enlarges respective images which are formed by light beams which are output from the first display device 20A and the second display device 20B by being input with light which is output from the optical axis identifying device 30, and forms an image by overlapping those images. As illustrated in FIG. 3, the enlarged-image forming device 50 according to the embodiment is configured by a concave mirror (it may be a nonspherical mirror to which an optical element having, for example, an enlarging function is added, in addition to this) of which a focal distance is f, and spherical radius is r, and when a distance from the first display device 20A (or, second display device 20B) to the enlarged-image forming device 50, that is, an object distance is set to $a_1$ (refer to FIG. 3), and a distance from the enlarged-image forming device 50 to an image forming (virtual image) point, that is, an image distance is set to $b_1$ (refer to FIG. 3), a well-known image formation formula of a reflecting mirror, $$1/a_1 + 1/b_1 = 1/f (=2/r) \quad (3)$$

is established.

Accordingly, as described in the column of the related art, in the enlarged-image forming device 50 according to the embodiment, an erected virtual image is also formed when an object point is provided between the mirror surface and the focal point, a larger virtual image than a display image in the first display device 20A (or, second display device 20B) is formed at the rear side of the concave mirror which is the enlarged-image forming device 50 (+X direction in FIG. 1), that is, in a space in front of the windshield which is a viewpoint of a driver, using the fact that the virtual image becomes larger than the size of the object which is provided at the object point, and by providing the first display device 20A (or, second display device 20B) between the mirror surface and the focal point.

Figure 4A:
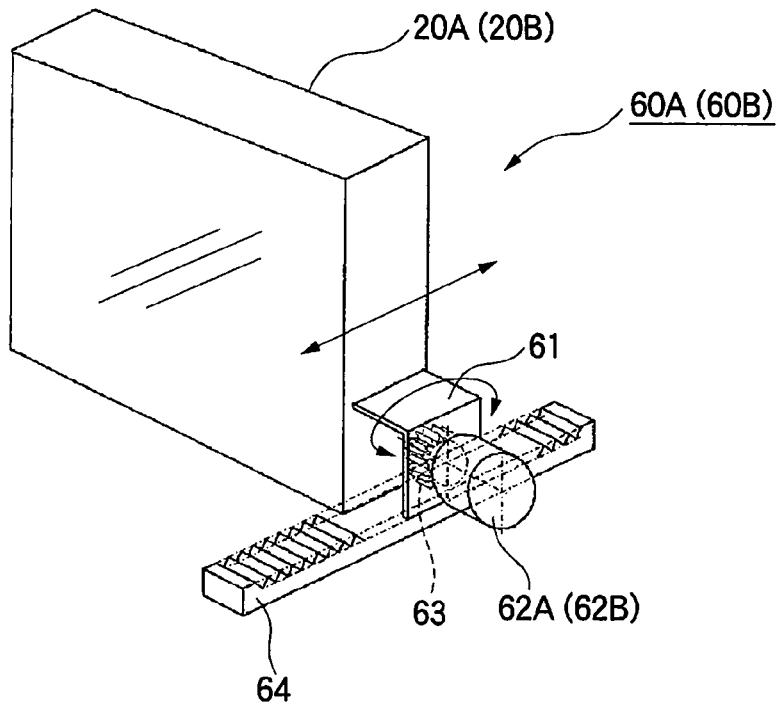
FIG. 4A is a configuration diagram which illustrates a specific example of moving device including the head-up display according to a first embodiment of the present invention.
Figure 4B:
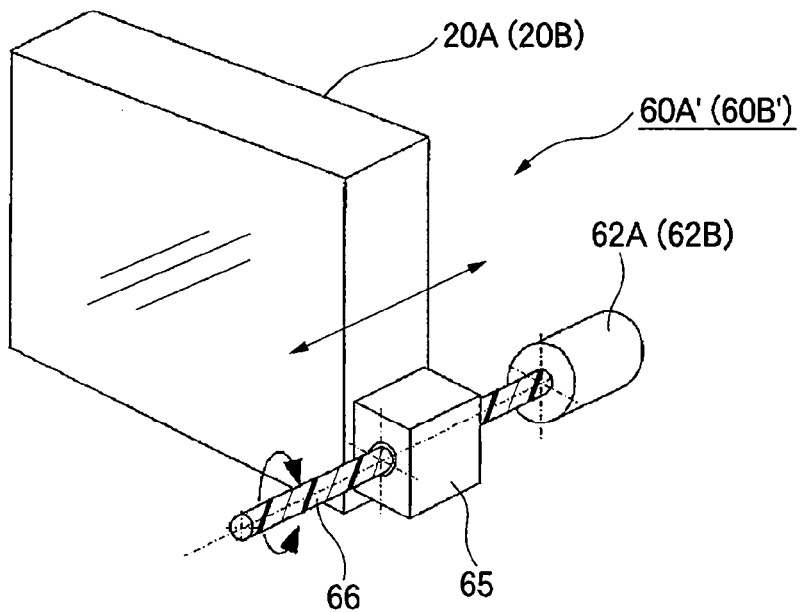
FIG. 4B is a configuration diagram which illustrates a modification example of the moving device.

The first moving device 60A is means for moving the first display device 20A back and forth along the optical axis direction, and changes a size of a virtual image which is formed by the first display device by operating thereof according to a speed of an automobile which is mounted with the head-up display 10A according to the embodiment. As illustrated in FIGS. 4A and 4B, the first moving device 60A according to the embodiment includes a first motor 62A which is fixed to a bracket 61 which is provided at a main body casing of the first LCD which configures the first display device 20A, a pinion 63 which is adhered to an output shaft of the first motor 62A, and a rack 64 which is provided to be fixed in the housing H (for example, on the floor face) of the head-up display 10A, and with which the pinion 63 is engaged.

Figure 5:
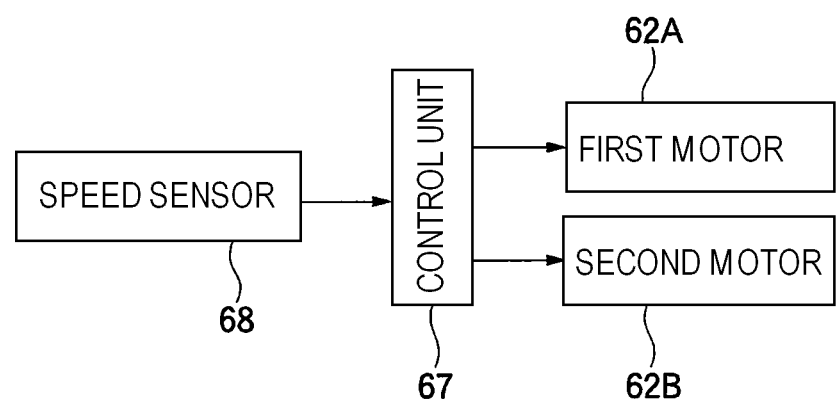
FIG. 5 is a block diagram which illustrates an electrical configuration which is used when controlling a motor of the moving device which is illustrated in FIGS. 4A and 4B.

In addition, the motor 62 is connected to a control unit 67 which is illustrated in FIG. 5, and in the control unit 67, when an output signal from the speed sensor 68 is input, a control signal corresponding to a speed of a vehicle is output to the first motor 62A from the control unit 67, and the first LCD is moved in a predetermined range.

That is, in the first motor 62A, a moving range which is allowed to the main body casing of the first LCD which configures the first display device 20A is the same as the range in the following expression (4) which allows the object distance a ($a_1$ to $a_3$), as illustrated in FIG. 3.

$$0 < a < f \quad (4)$$

That is, the movement of the main body casing of the first LCD is in the range of the above expression (4) at most, and specifically, is limited into a range between two points of the position of the concave mirror (point P) which is the enlarged-image forming device 50, and a focal point position (point F) thereof.

The second moving device 60B also has the identical configuration as that in the first moving device 60A, and as illustrated in FIG. 5, a moving operation of the second LCD is performed by a control signal of the control unit 67, however, in many cases, the moving operation of the second LCD is performed so as not to be the same as the moving operation of the first LCD, that is, so as not to have the same moving speed, or moving distance (as general rule).

In addition, according to the embodiment, as specific mechanisms of the first moving device 60A and the second moving device 60B, the rack and pinion are used, however, in addition to these, for example, it may be a configuration in which a mechanism using ball screws is adopted which is illustrated in FIG. 4B. That is, the ball screw mechanism includes the first motor 62A (or second motor 62B) which is provided so as to be fixed into the housing H, a screwing member 65 which is provided so as to be fixed to the main body casing of the first LCD (or second LCD), and a ball screw member 66 which is integrally connected to an output shaft of the first motor 62A (or second motor 62B), and is screwed to a female screw which is cut by the screwing member 65, and it has a configuration in which a base portion of the main body casing of the first LCD (or second LCD) is slid along the inside (for example, floor portion) of the housing H of the head-up display 10A.

Subsequently, operations of the head-up display 10A according to the embodiment of the present invention will be described.

First, it is assumed that, for example, a vehicle which is mounted with the head-up display 10A is traveling a highway in a range of the legal speed limit (for example, 88 km/h) which is a predetermined speed (set speed of ACC (adaptive cruise control)). In this case, a predetermined output signal corresponding to the speed (88 km/h) from the speed sensor 68 is input to the control unit 67. From the control unit 67 to which the output signal is input, control signals for driving are output to the first motor 62A of the first moving device 60A, and the second motor 62B of the second moving device 60B, respectively. In this manner, the first motor 62A and the second motor 62B are driven, and the first LCD which is the first display device 20A, and the second LCD which is the second display device 20B are moved to predetermined positions.

Figure 6:
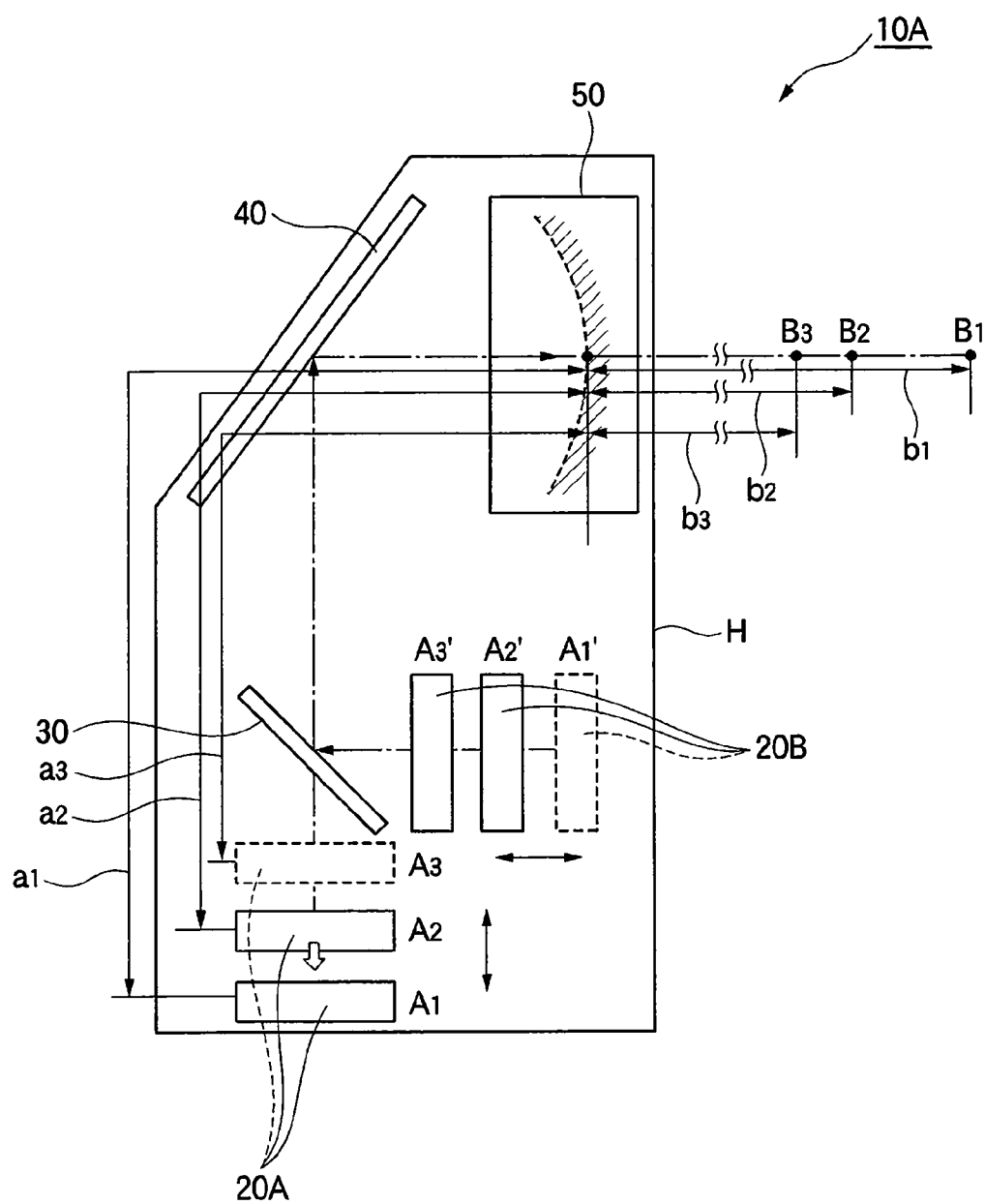
FIG. 6 is an explanatory diagram which illustrates operations according to the first embodiment of the present invention.

That is, in FIG. 6, for example, the first LCD moves to an object distance $a_2$ from a second object point position ($A_2$), that is, the concave mirror which is the enlarged-image forming device 50. In this manner, in FIG. 3, in the first waveform relating to the speed information (88 km/h) output from the first LCD which is present at the second object point position ($A_2$), after the waveform has transmitted the half mirror which is the optical axis identifying device 30 at a predetermined ratio, an optical path thereof is deflected (folded) by 90 degrees in the deflecting mirror 40, and proceeds to the concave mirror which is the enlarged-image forming device 50.

In addition, when the waveform is input to the concave mirror, speed information of an erected virtual image ($\alpha_2$; refer to FIG. 7A) of approximately a medium size is formed and displayed on the rear side, that is, a second virtual image point position ($B_2$) in a field of vision of relatively forward of a driver who is present in front of a windshield of a vehicle. Here, a specific formation position of the second virtual image point position $B_2$ is the rear surface side of the concave mirror (front side of vehicle in traveling direction), and $b_2$ from the position of the concave mirror which is the enlarged-image forming device 50 (in other words, image distance $b_2$ from concave mirror). According to formulation, the above relation becomes an expression (5), which is a well-known formula regarding the concave mirror, according to the expression (3).

$$b_2 = a_2 \cdot f/(a_2 - f) \quad (5)$$

Similarly, a predetermined output signal corresponding to the speed is input to the control unit 67 from the speed sensor

68. A driving control signal is output to the second motor 62B of the second moving device 60B from the control unit 67 to which the output signal is input. In addition, the second LCD which is the second display device 20B is moved to a predetermined position. That is, the second LCD is also moved to the second object point position ($A_2'$) which is the identical as the second object point position ($A_2$) of the first LCD, that is, in FIG. 6, a position which is separated from the concave mirror which is the enlarged-image forming device 50 by the identical distance $a_2$ as the object distance $a_2$.

In this manner, a second waveform relating to frame information which is output from the second LCD which is present at the second object point position is reflected on the half mirror which is the optical axis identifying device 30, traces the identical course as that of the first waveform while being interfered with the above described first waveform, and is input to the concave mirror which is the enlarged-image forming device 50. After that, frame information ($\beta_2$; refer to FIG. 7A) of approximately a medium size is formed and displayed on the rear side, that is, at the identical virtual image point position ($B_2$) as the second virtual image point position ($B_2$) at which the speed information of the first waveform is formed and displayed, in a field of vision in front of a driver who is present in front of a windshield of a vehicle.

Figure 7A:
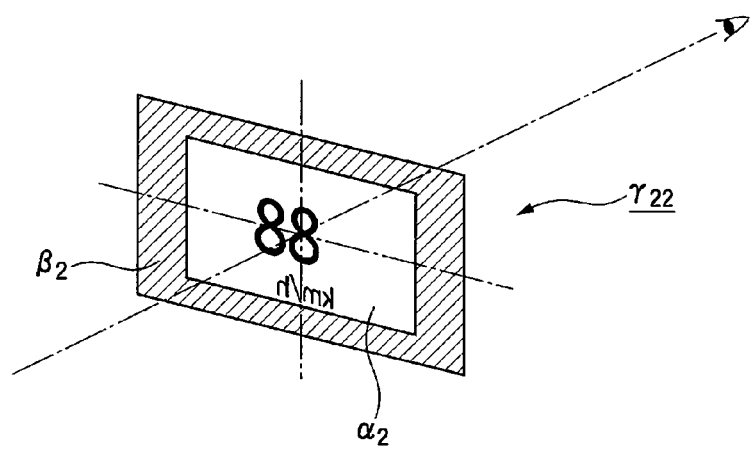
FIG. 7A is a schematic figure of a principle which illustrates a display image when traveling at a legal speed limit which is formed by the head-up display according to the first embodiment of the present invention.
Figure 8A:
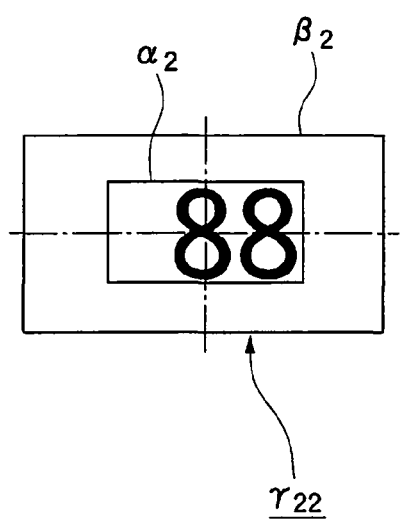
FIGS. 8A and 8B are explanatory diagrams which illustrate a relationship in magnitude of both pieces of display information when a ratio in magnitude of speed information ($\alpha_2$) to frame information ($\beta_2$) is changed according to the first embodiment of the present invention.

That is, when a vehicle is traveling at a medium speed (for example, 88 km/h) which exceeds a predetermined reference speed, a digital speedometer ($\gamma_{22}$; refer to FIG. 8A) in which speed information ($\alpha_2$) of an erected virtual image of approximately a medium size, and frame information ($\beta_2$) of an erected virtual image of approximately a medium size are overlapped as illustrated in FIG. 7A is displayed in the field of vision of relatively ahead of a driver who is present in front of a windshield of a vehicle. In addition, display contents here denote that the traveling current speed is 88 km/h.

Figure 7B:
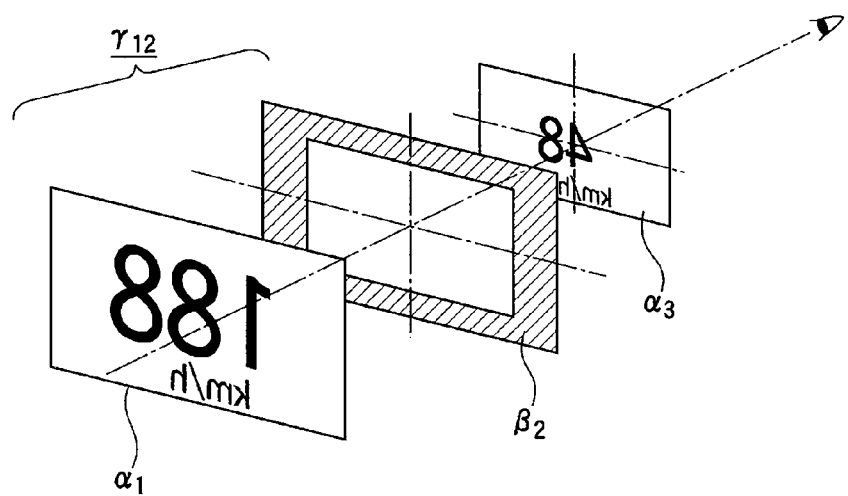
FIG. 7B is a schematic figure of the principle which illustrates a display image when traveling at high speed.

Subsequently, a case is assumed in which a vehicle traveling speed increases, for example, and the vehicle performs temporal high speed traveling (for example, 188 km/h) by changing a lane to an overtaking lane in order to pass a vehicle which is traveling in a driving lane in front of the vehicle, for example. Similarly, in this case, as well, first, a predetermined output signal corresponding to the speed is input to the control unit 67 from the speed sensor 68. From the control unit 67 to which the output signal is input, a driving control signal is output to the first motor 62A of the first moving device 60A, and the first LCD which is the first display device 20A is moved to a predetermined position. That is, the first LCD moves to the first object point position ($A_1$) from the original second object point position ($A_2$), that is, a position which is separated from the concave mirror which is the enlarged-image forming device 50 by the object distance $a_2$, in FIGS. 3 and 6. In this manner, in FIGS. 3 and 6, speed information of a large erected virtual image ($\alpha_1$; refer to FIG. 7B) is formed and displayed at the first virtual image point position ($B_1$) in the field of vision which is far ahead of a driver who is present in front of a windshield of a vehicle.

On the other hand, a driving control signal is not output to the second motor 62B of the second moving device 60B from the control unit 67. For this reason, the second LCD which is the second display device 20B does not move, and there is no change in position. The second waveform relating to the frame information which is output from the second LCD which is present at the second object point position ($A_2'$) is input to the concave mirror which is the enlarged-image forming device 50. As a result, frame information ($\beta_2$; refer to FIG. 7B) of approximately a medium size is formed and displayed at the original second virtual image point position ($B_2$) in the field of vision of relatively in front of a driver who is present in front of a windshield of a vehicle.

Figure 8B:
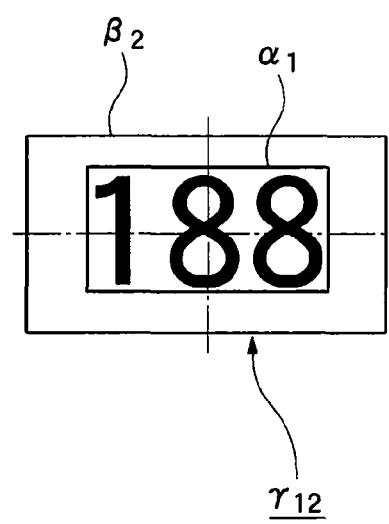

Due to this, when the vehicle is dangerously traveling at high speed, as illustrated in FIG. 8B, a digital speedometer information ($\beta_2$) in which speed information ($\alpha_1$) of a large size, and frame information ($\beta_2$) of approximately a medium size are overlapped is displayed in the field of vision of relatively ahead of a driver who is present in front of a windshield of a vehicle. Since the frame information is displayed so as not to be extremely large, it is possible to prevent a field of vision of a driver from being disturbed by the frame information. In addition, simultaneously, since the current traveling speed which is too fast can be displayed using numbers of a large size, it is possible to contribute to safe driving.

In addition, according to the embodiment, the first display device is configured as digital speed information, and the second display device is configured as frame information, however, these can also be applied to map information in a navigation system, for example. It may be a configuration in which, for example, when a distance to an intersection becomes short, a size of a frame becomes gradually large without changing a size of a display of a map, thereby informing that the intersection gets closer (or it may be the opposite). In addition, it may be a configuration in which the display device is applied to a display as an interpersonal sensor, and only a distance to an object becomes gradually large when a pedestrian, a bicycle, or the like gets closer in front of a vehicle, or the like.

Meanwhile, in general, when it is high speed traveling in which a viewpoint shifts to the far side, if it is a case in the related art, various pieces of display information are displayed by also shifting a virtual image point position to the far side, similarly, in order to reduce a visual burden of a driver. For this reason, there has been a concern that it may create dangerous driving circumstances, since the display information becomes large in size, and becomes an obstacle in a field of vision. On the other hand, according to the embodiment, object distances of the first display device 20A and the second display device 20B are adjusted by appropriately operating the first moving device 60A and the second moving device 60B. For this reason, it is possible to change a distance of an image which is formed by the concave mirror which is the enlarged-image forming device 50. As a result, it is possible to appropriately change a size of display information which is formed at an image position based on the respective first display device 20A and the second display device 20B, that is, a ratio (magnification; m=b/a) of a size of display information of a virtual image to a size of a formation image in the original display device which is formed.

For example, as described above, it is possible to execute a display configuration in which safe driving gets the top priority, by setting and maintaining only important information which is the minimum requirement (in case of the embodiment, speed information which is formed by first display device 20A) at the identical focal point position, displaying information which is less important (in case of the embodiment, frame information which is formed by second display device 20B), small, or the like.

In addition, in a case in which a speed is low, and a viewpoint of a driver is close, when a virtual image which is formed by the concave mirror which is the enlarged-image forming device 50 is also displayed in the vicinity of the viewpoint, a magnification in the original display device with respect to a formed image also becomes small. For this reason, it is expected that a case also may occur in which characters, or marks as information to be displayed also become small, and become difficult to read (refer to speed information ($α_3$) of small-sized number in FIG. 7B). In such a case, it is possible to appropriately control operations of moving device so that only information on characters, or marks is largely displayed, selectively.

Figure 9A:
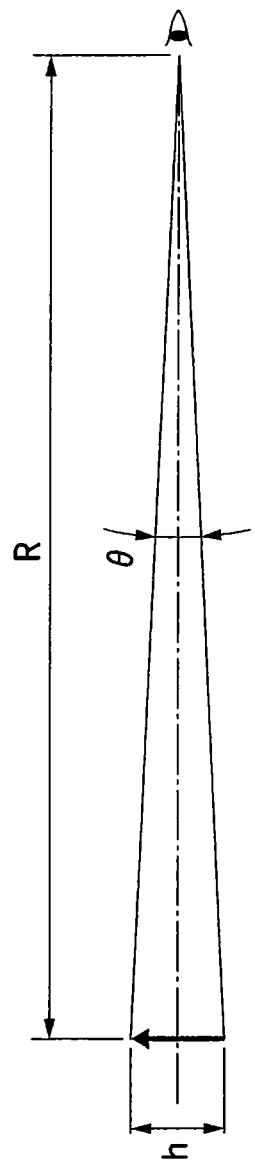
FIGS. 9A and 9B are principle figures which illustrate a relationship between a parallactic angle and a minimum size of an established virtual image which is displayed according to the first embodiment of the present invention.
Figure 9B:
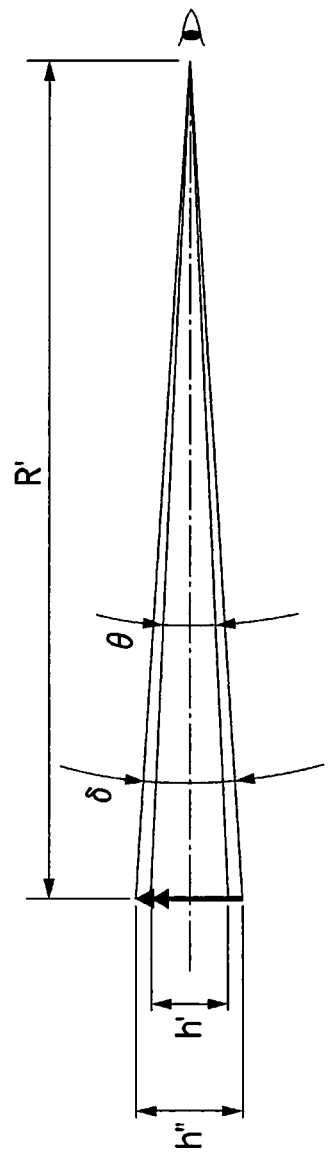
Figure 10:
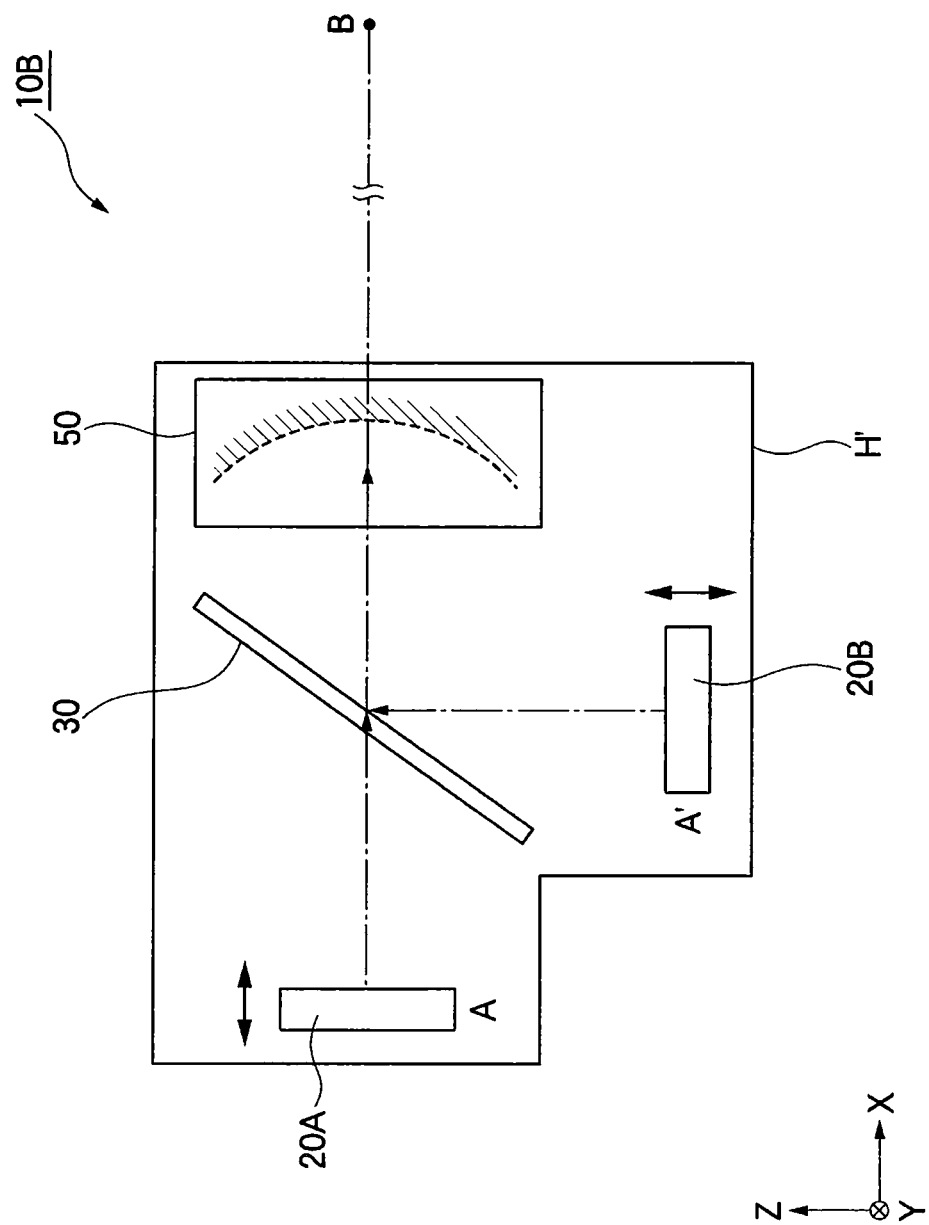
FIG. 10 is a schematic configuration diagram which illustrates a head-up display according to a second embodiment of the present invention.
Figure 11:
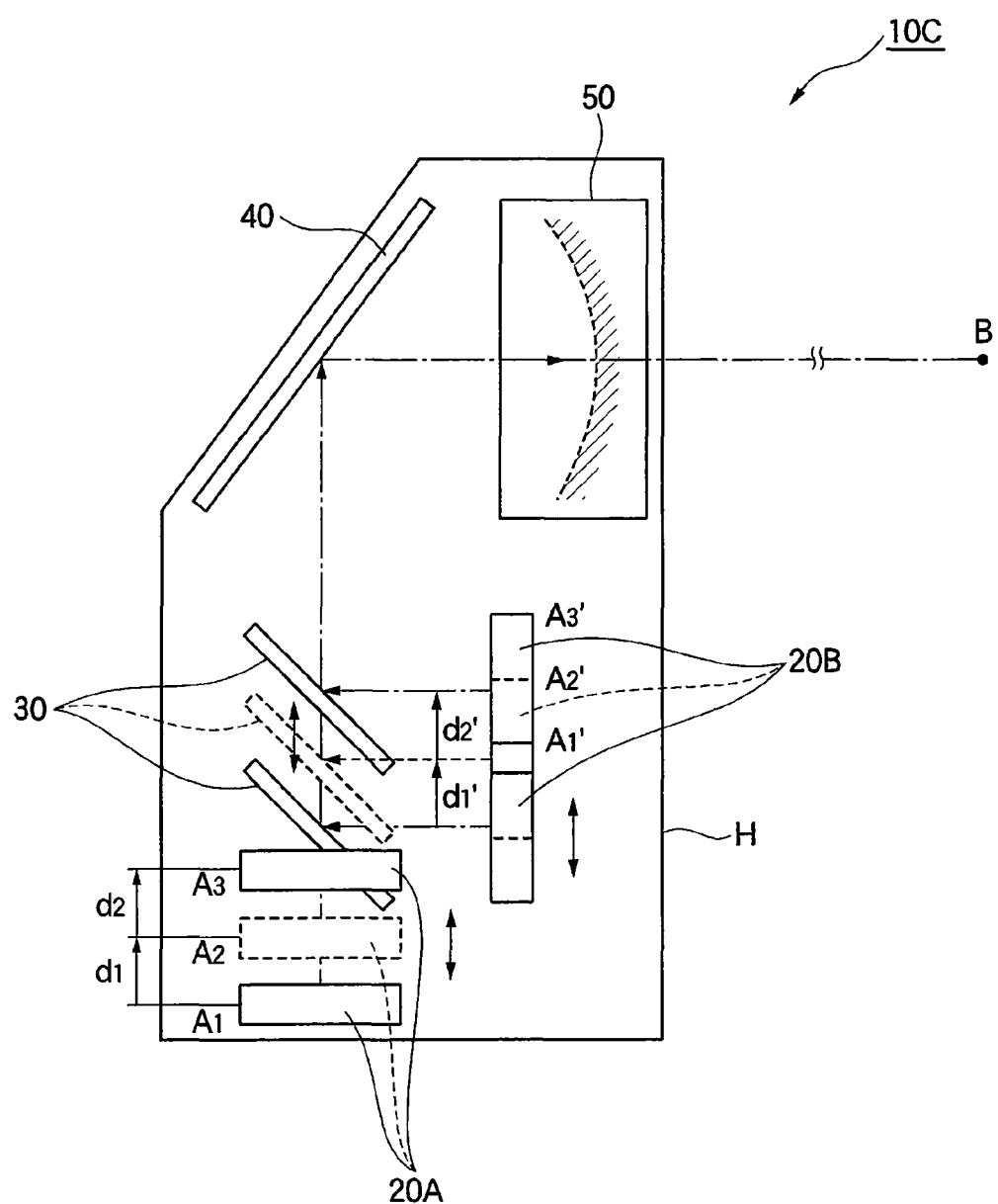
FIG. 11 is a schematic configuration diagram which illustrates a head-up display according to a third embodiment of the present invention.
Figure 12:
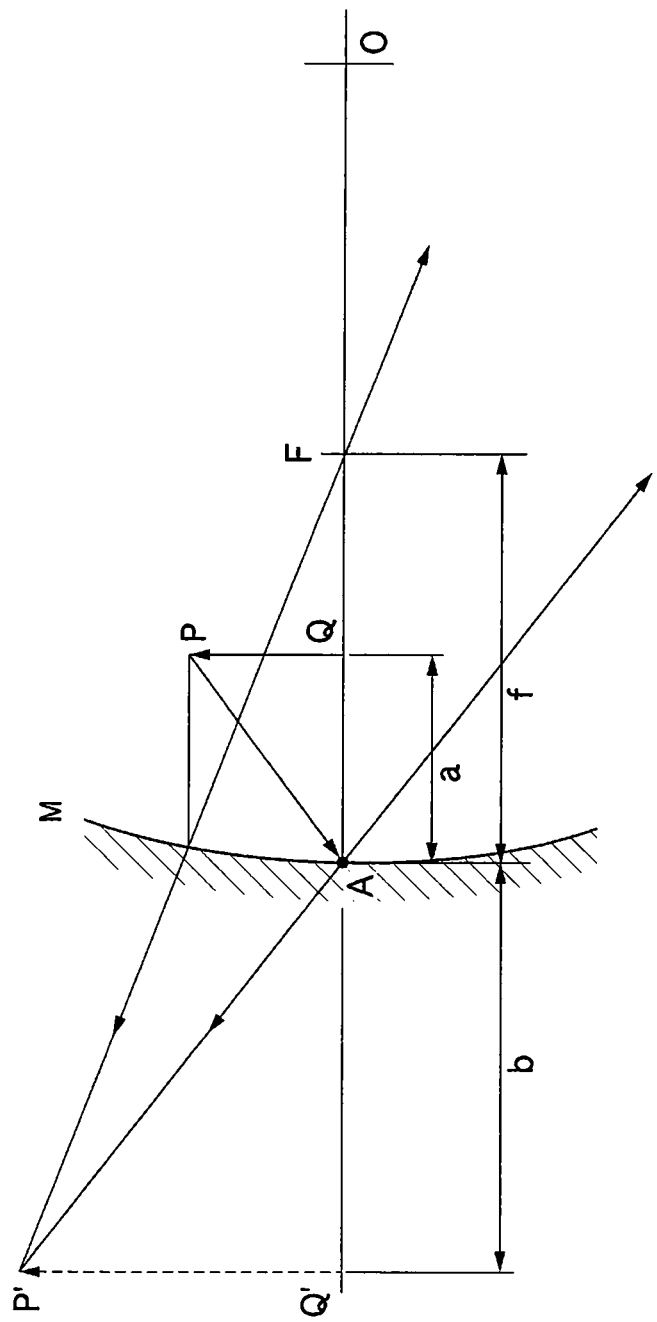
FIG. 12 is an optical explanatory diagram which illustrates a principle of an HUD in the related art.
Figure 13:
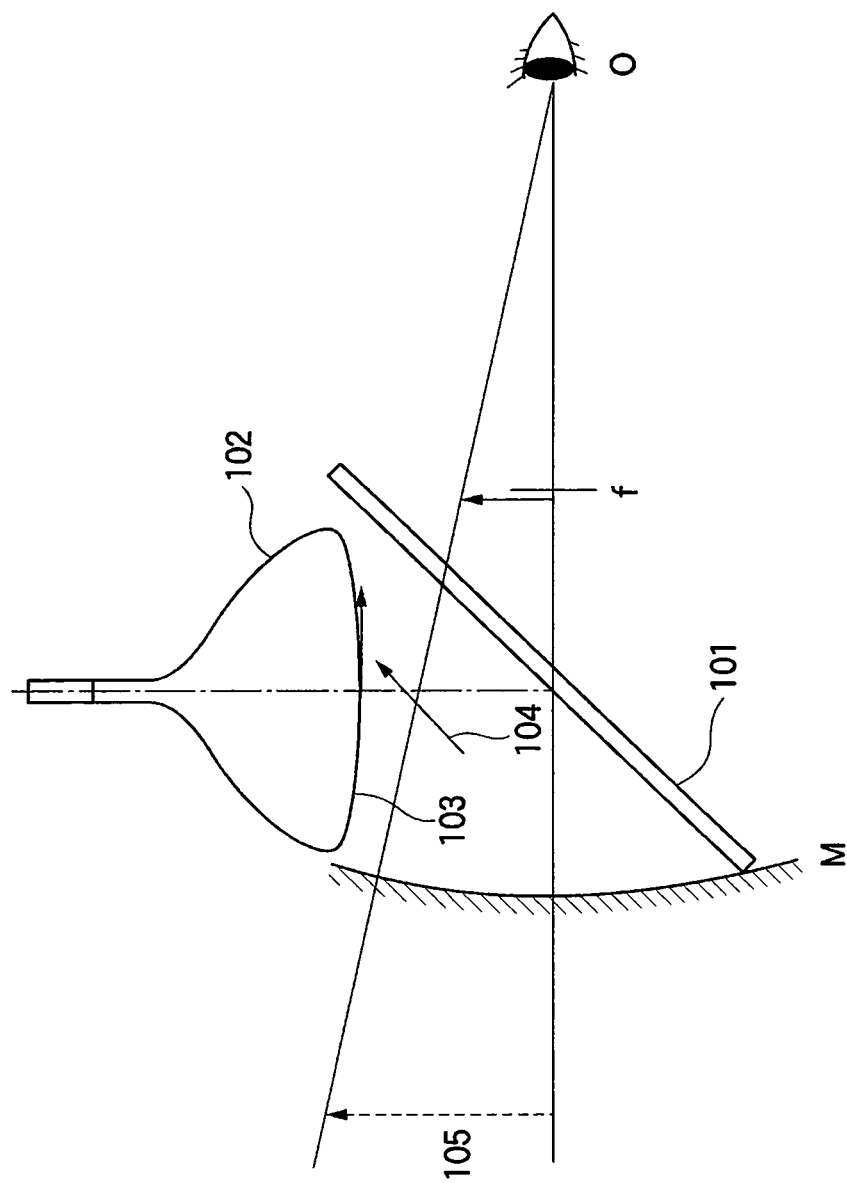
FIG. 13 is an explanatory diagram which illustrates a configuration of the HUD in the related art.
Figure 14:
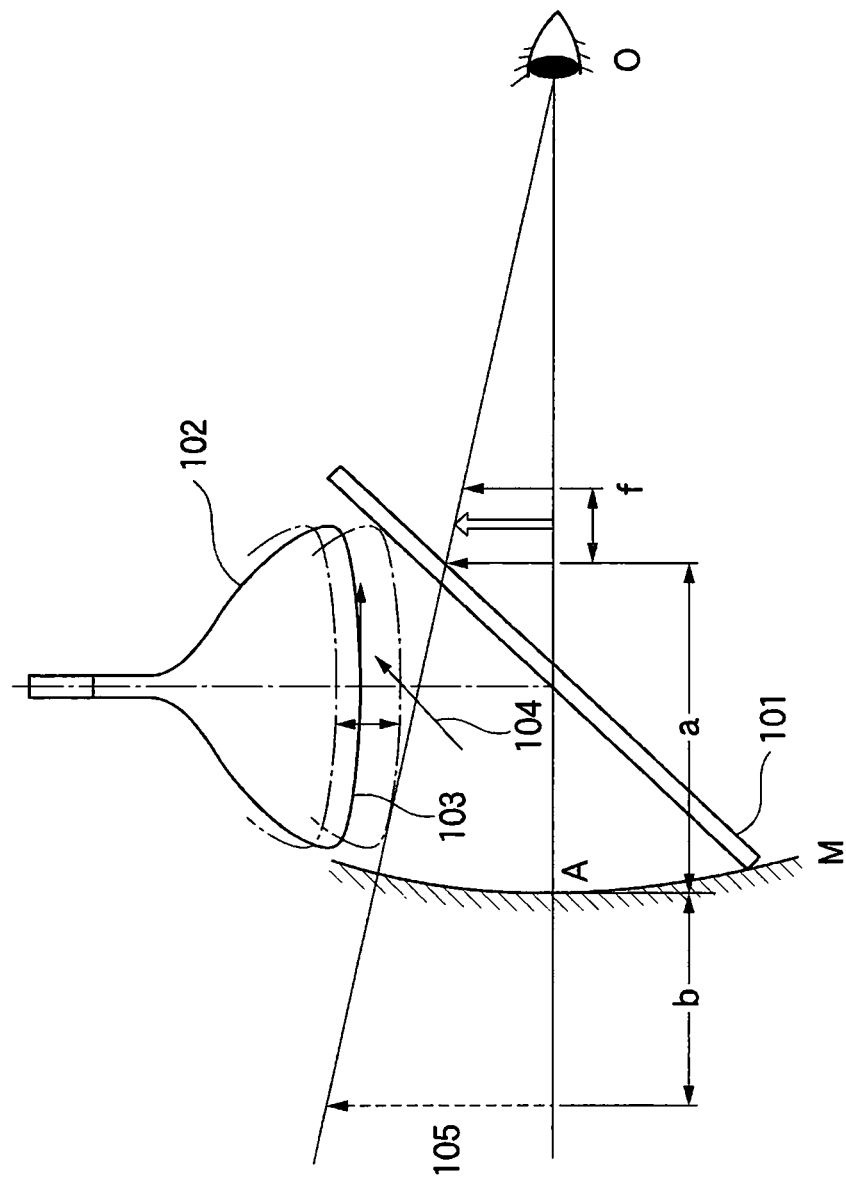
FIG. 14 is an explanatory diagram which illustrates a configuration of an HUD in which an image forming position of a virtual image as display information in the related art can be changed.
Figure 15:
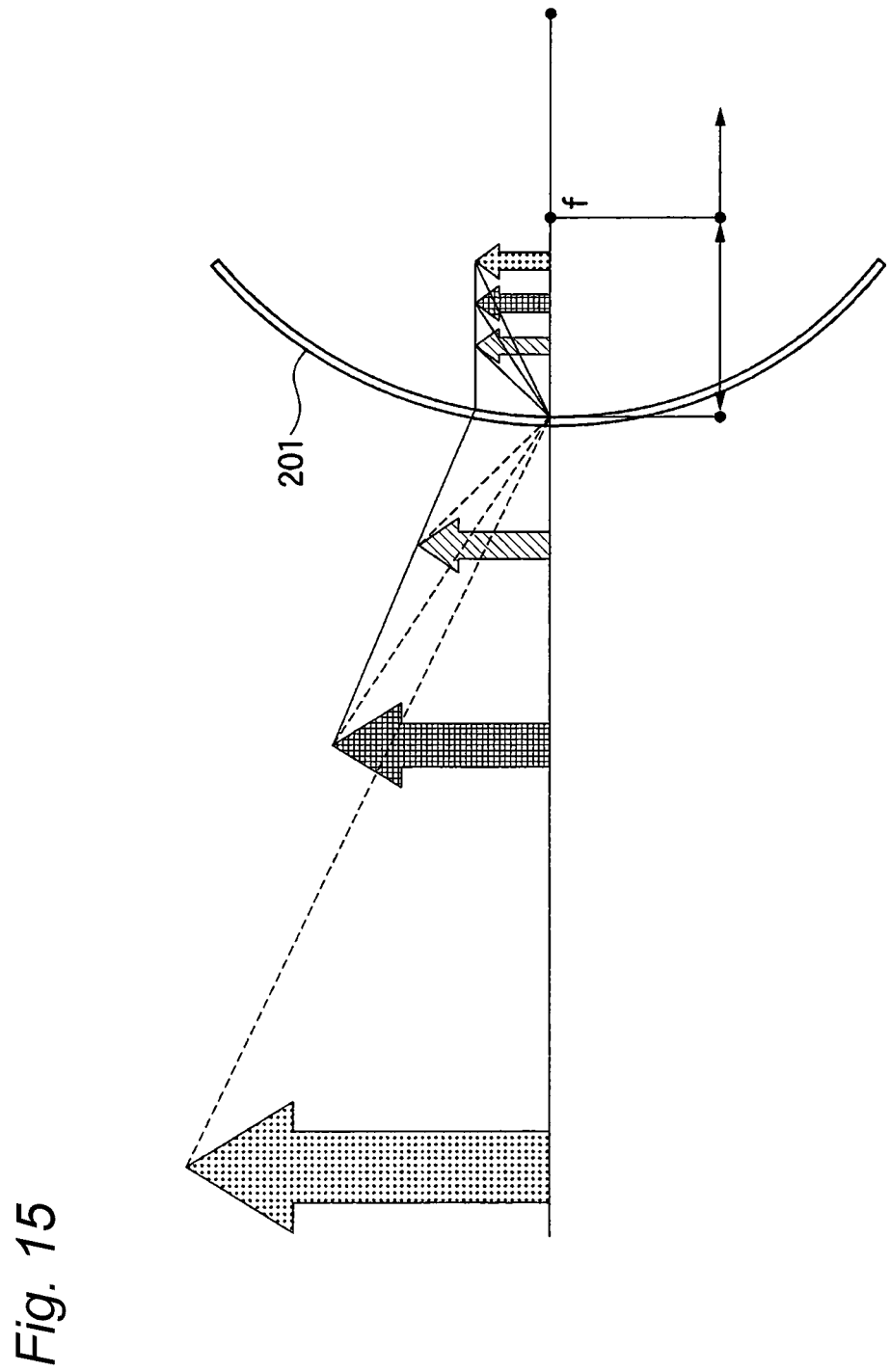
FIG. 15 is a diagram of an optical path in a concave mirror which illustrates a principle of an HUD in the related art which includes a control unit which makes an image forming position of a virtual image changeable.
Figure 16:
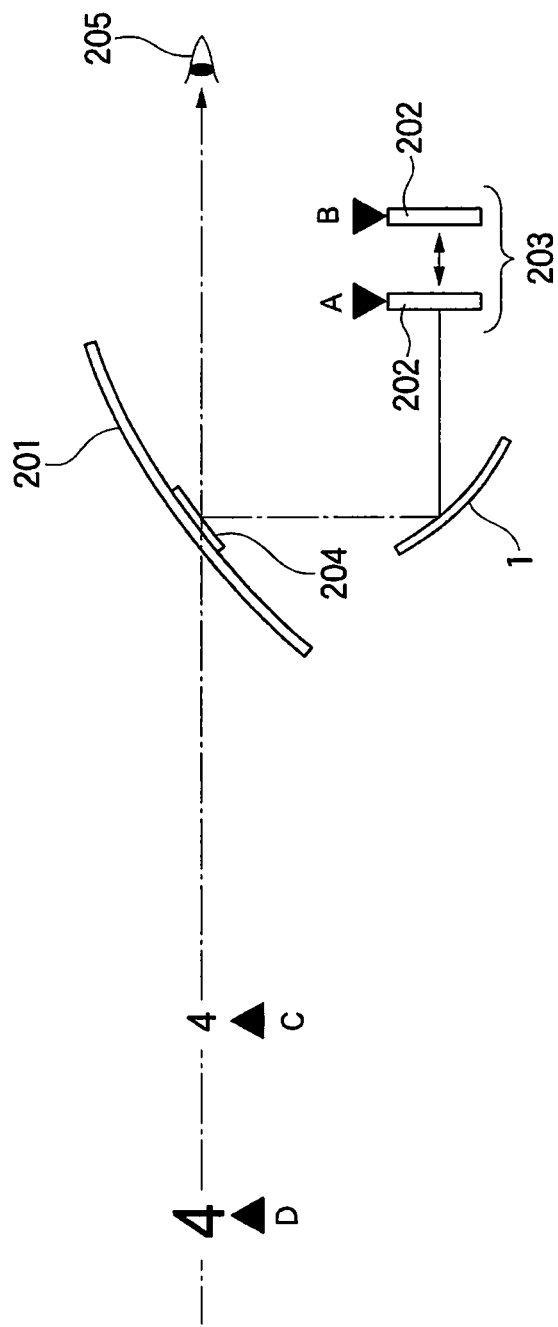
FIG. 16 is an explanatory diagram which illustrates a relationship between movements of image forming positions in the HUD.

That is, as illustrated in FIG. 9A, when a display image is viewed by securing, for example, a parallactic angle θ which is illustrated in the same figure (A), and is minimum necessity for reading in the far viewpoint, the minimum size of the display image becomes h. Here, since the parallactic angle θ is a value which is mathematically small enough ($=π/180$ (rad)) in a range of approximately 1°, when regarding the size h of the above described display image which is the size of a virtual image as an arc which is formed by the parallactic angle θ, as is well known in a field of analysis in elementary mathematics, it is possible to express in the following expression (6) as approximation equation.

$$h ≈ Rπ/180 \quad (6)$$

Here, R is radius of circle at which arc is formed.

On the other hand, in the near viewpoint which is illustrated in the identical figure (B), when a display image is viewed by securing the parallactic angle θ which is minimum necessity, the minimum size of the display image becomes h'. That is, when regarding the h' as an arc, similarly, and approximately, the following expression (7).

$$h' ≈ R'π/180 \quad (7)$$

Here, R' is radius of circle at which arc h' is formed.

Accordingly, when trying to secure at least the same size h as the size of the above described display image by setting the minimum readable size of a display image to h", that is, in order to make h"=h, a parallactic angle δ thereof should satisfy the following expression (8).

$$δ = θ · R/R' \quad (8)$$

Accordingly, it is understood that a virtual image of the parallactic angle δ which is denoted by the expression (8) may be formed in the concave mirror which is the enlarged-image forming device 50.

(Second Embodiment)

Subsequently, a head-up display 10B according to a second embodiment of the present invention will be described. In addition, according to the embodiment, the same portions as in the first embodiment will be given the same reference numerals, and repeated descriptions will be avoided.

A difference of the head-up display 10B according to the embodiment from the head-up display 10A according to the first embodiment is that the deflecting mirror 40 is not provided. In addition, in the head-up display 10B according to the embodiment, as well, first and second display devices 20A and 20B are attached with first and second moving device, respectively, though they are not shown.

Accordingly, according to the embodiment, the same operations and effects as in the head-up display 10A in the first embodiment are obtained, however, it is possible to reduce the manufacturing cost, and to reduce the size of the housing H', since the deflecting mirror 40 is not provided.

(Third Embodiment)

Subsequently, a head-up display 10C according to a third embodiment of the present invention will be described. In addition, in the embodiment, as well, the same portions as in the first embodiment will be given the same reference numerals, and repeated descriptions will be avoided.

The head-up display 100 according to the embodiment has approximately the same configuration as the head-up display 10A in the first embodiment, however, not only first and second display devices 20A and 20B are attached with first and second moving device which are not shown, respectively, optical axis identifying device 30 is also attached with the same moving device as the first and second moving device which are not shown, and three optical elements (first display device 20A, second display device 20B, half mirror which is optical axis identifying device 30, or the like) are able to perform translation in the identical direction (vertical direction in figure), respectively.

These three moving device are able to perform independent and individual moving operations with respect to the respective optical elements, and by relatively changing positions by inherent quantity of movement, respectively, according to a traveling speed of a vehicle on which the head-up display 10C according to the embodiment is mounted, it is possible to perform broad relative changes in optical distances which are different from each other with respect to the respective object distance (a) and image distance (b) corresponding to the first and second display devices 20A and 20B.

For this reason, enlarged virtual images which have inherent sizes which are enlarged by inherent magnifications m(=b/a) which are different from each other with respect to display images by the first and second display devices 20A and 20B are displayed as an image which is overlapped in a field of vision of a driver who is present in front of a windshield (not shown) which is the driving direction.

In addition, according to the embodiment, it is possible to perform a complicated magnification change with respect to each enlarged virtual image which is overlapped using the three moving device, however, if it is possible to exert the same effects, it may be a configuration in which a change by the same optical distance can be made by integrating all of the three optical elements at the identical time. In that case, it is possible to reduce the cost, and to reduce a size of a device, since one moving device is enough for the configuration.

In addition, the present invention does not limit the above described embodiments, and can be embodied in various modes, without departing from the scope of the invention. For example, it may be configured such that the moving device of the first and second display devices are attached to at least any one of both, and change a magnification of at least any one of virtual images in each of virtual images which is formed corresponding to each display device.

According to the head-up display having the above described configuration, when a display position is moved in the front-back direction of a vehicle, it is possible to add various effective functions in connection therewith, and to make display information so as to be able to display display contents such as warning relating to driving sensuously, and easy to understand.

According to a head-up display in the present invention, since it is configured such that a ratio of magnification of a size of a virtual image which is formed by a first display device to a size of a virtual image which is formed by a second display device can be changed by operating each moving device according to a speed of a vehicle, it is possible to provide a head-up display in which, when a display position is moved in the front-back direction of a vehicle, various effective functions are added in connection therewith, and which can make display information so as to be able to display display contents such as warning relating to driving sensuously, and easy to understand.

The present invention has been described in detail, or by referring to specified embodiments, however, adding various modifications, or corrections without departing from the spirit and scope of the invention can be easily conceived by those skilled in the art.

In the head-up display according to the present invention, the following effects are obtained, for example, when a display position is moved in the front-back direction of a vehicle, it is possible to add effective various functions relating to the movement, and to make display contents such as warning relating to driving sensuously, and easy to understand with respect to display information.

The present application is made based on Japanese Patent Application No. 2010-204688 filed on Sep. 13, 2010, and contents thereof are incorporated as references.

What is claimed is:

1. A head-up display comprising:
    a first display device configured to emit a first light beam along a first optical axis;
    a second display device, provided at a position which is different from a position of the first display device, the second display device configured to emit a second light beam along a second optical axis that is non-parallel to the first optical axis;
    an optical axis identifying device configured to receive the first light beam and the second light beam, and configured to identify the first optical axis of the first light beam input from the first display device and the second optical axis of the second light beam input from the second display device, and configured to output the first and second light beams in the identical direction; and
    an enlarged-image forming device that enlarges respective images which are formed by the first and second light beams which are output from the first display device and the second display device, based on the light beams which are input from the optical axis identifying device, and configured to form an image by overlapping the images which are enlarged.

2. The head-up display as set forth in claim 1, further comprising:
    a moving device that moves at least one of the first display device and the second display device along respective optical axis directions thereof.

3. The head-up display as set forth in claim 2,
    wherein the moving device includes first moving device that moves the first display device along the optical axis direction thereof, and second moving device that moves the second display device along the optical axis direction thereof.

* * * * *